United States Patent

Krel

Patent Number: 5,810,107
Date of Patent: Sep. 22, 1998

[54] ONE PEDAL SAFETY DRIVING SYSTEM

[75] Inventor: Aleksandr Krel, San Francisco, Calif.

[73] Assignee: Alla Krel, Emervile, Calif.

[21] Appl. No.: 531,826

[22] Filed: Sep. 20, 1995

[51] Int. Cl.$^6$ .................................................. B60K 26/00
[52] U.S. Cl. ............................ 180/275; 180/333; 303/16
[58] Field of Search .................................... 180/275, 333, 180/271; 188/72.1, 163; 303/16, 135, 157, 167

[56] References Cited

U.S. PATENT DOCUMENTS

| | | | |
|---|---|---|---|
| 3,059,716 | 10/1962 | Iserman et al. | 180/275 |
| 4,146,108 | 3/1979 | Sato | 180/103 |
| 5,193,640 | 3/1993 | Lee | 180/271 |
| 5,286,099 | 2/1994 | Fujita | 303/103 |
| 5,553,684 | 9/1996 | Bolduc | 180/333 |

*Primary Examiner*—Christopher P. Ellis

[57] ABSTRACT

Foot operated safety driving system, that realizes slow down of vehicle by driver's pushing a gas pedal (10). A foot toe pressure piezoelectric sensor (12T) and a foot heel sensor (12H), joined with gas pedal (10), convert all driver's foot pressure impulses to an electric signal; a sensors' cord (78) transmits the signal to an electric device (74). An input processing circuit of the device (74) selects from the electric signal a brake pulse by comparators (28) and (30), verifies and forms the brake pulse by a strobing transistor (22) and a conjunction gate (32), and uses the processed brake pulse to actuate a group of output thyristor controllable electron valves (34), (36), (38). Output current of thyristor (34) by an output cord (84) actuates a 3-way brake fluid distributor valve (56) and a 2-way fuel bypass valve (58), placed in a basic executive set (60), whereby the system switches vehicle's regime from accelerating to braking by converting its kinetic energy to friction energy; after preventing an accident the driver switches the vehicle regime back from braking to accelerating by operating interruption output current pushbuttons (40), (42), (44).

17 Claims, 4 Drawing Sheets

ONE PEDAL SAFETY DRIVING SYSTEM

BACKGROUND

1. Field of Invention

This invention relates to a motor land vehicle, specifically to systems and devices for promoting safety of vehicle, its occupants, load, external objects; and it can be used in produced vehicles with an internal combustion engine as well as in elaborated electric powered vehicles.

2. Discussion of Prior Art

Safety driving is an actual problem now. Vehicle accidents are increasing with growth of total vehicles, and their speed. Losses, caused by vehicle accidents, are comparable with the losses in the actions of war. This fact stimulates a lot of innovation in field of promoting safe driving.

As of Sep. 1, 1989 all new passenger vehicles, produced for sale in the US, are required to have: an air bag, patented in the US, at Aug. 18, 1953 by John W. Hetrich, U.S. Pat. No. 2,649,311; or a safety belt, patented in 1963, by Volvo, Swedish. These restrains protect riders after the accident.

More fast-acting and reliable brake systems prevent the vehicle and its occupants from the accident. Some newest improvements in this field are as follows:

anti-locking brake system: ABS, 1982, German, Bosch;

wedge brake system: USA, Bendix, 1978, 1984;

anti-skid system: 1985, Swedish, Volvo

Nevertheless, the brake system has grave shortcomings. Statistical facts of imperfection of the existing brake system are as follows:

the USA total loss, caused by car accidents, are $167.3 billion in 1993;

there were in 1993 about 2 million car accidents, and 42 thousand of them were with a fatal outcome.

All statistical facts here and further are adopted from:

1. 1994 accident facts.
2. 1992 Motor Vehicles Manufacturers MVMA motor facts & figures.

Shortcomings of the existing brake systems are as follows:

(a) Insufficient Fast-Acting.

This is a main cause of accidents. The number of accidents is in direct proportion to a vehicle's stop distance and to the total stopping time. A value of this time now is about 2.5 second for the best vehicle models. It is insufficient for safe driving in present traffic.

(b) Complexity in Operation.

In case of a sudden emergency the driver of the moving vehicle needs to take the following three steps:

to stop speeding-up by releasing the accelerator pedal.

to carry a foot from the accelerator to the brake pedal.

to press sharply and quickly on the brake pedal.

These steps determine the value of driver's reaction time. The steps take a time of about 0.5–1 second for experienced drivers, that is 20–40% of the total stopping time. The steps of braking have remained invariable since 1896, when the first serial vehicle was produced. The traffic at present is much heavier and requires making changes to quicken and simplify driving operations.

(c) Psychological and Logical Insuitability.

90% of all accidents and 45% of traffic fatalities were caused by an intoxicated or alcohol-impaired driver or non-motorist in 1992. The more the driver is unskilled and careless, the more the driven car is dangerous. So, the traffic is not prevented from such drivers now.

the driver's spontaneous reflex in case of emergency is to push the pedal. If the driver pushes by mistake at the accelerator pedal instead of the brake pedal, there will be a certain accident. There is no time to choose the pedal in an accident situation. Even if there are no obvious mistakes in the driver's actions, he unconsciously spends some valuable time to analyze the situation.

(d) Dependence on the Weather.

Statistically more than 70% of all accidents happen in wet, slippery weather. There is a lesser value of friction and cohesive forces in such weather. It complicates the driver's actions, increases the car stop distance, and worsens the firmness and stability of the car. Finally, it increases the number of accidents.

(e) Inefficiency of the Existing Brake Method.

The existing brake system slows down the car by converting its kinetic energy to heat, friction energy and by creating of additional braking moment by an engine. This method destroys brake shoes, pads, tires, roads, external objects; it shortens the vehicle's longevity, and decreases the reliability and durability of the car. Nevertheless, since 1896 to the present time this method has remained the easiest and fastest. Changing of the conversion in existing system will worsen the fast-acting, and therefore existing system is invariable in spite of all its shortcomings.

OBJECTS AND ADVANTAGES

To overcome these shortcomings the present invention is developed to produce equipment that improves a brake system and makes the system:

(a) More Fast-Acting

Using the accelerator pedal for braking eliminates the steps of releasing and changing pedals. It improves the driver's reaction time at 20–40% and shortens the car stop distance. Finally, it reduces losses, caused by car accidents approximately at 20–40% too. The methods, using the conversion of car brake kinetic energy to other types of energy, are more effective.

(b) Simpler in Operation

A car with a single operating pedal will be one that consumers prefer to buy. The automatic transmission, patented in the USA by Earl A. Thompson in 1939, eliminated the clutch pedal. This elimination caused growth of fuel consumption and the price of the car. In spite of this, 90% of sold cars in 1992 had the two pedal operating system with automatic transmission, because it is easier to operate. Now is the time to eliminate the brake pedal for emergency slow down, that provides the one pedal driving system invention.

(c) More Psychologically and Logically Substantiated

The driver's unconditional reflex in case of emergency is to push the pedal, without choosing a pedal and doubt. By using the system, first there will be elimination of accidents, caused by driver's mistakenly pressing on the wrong pedal.

Second, incorrect speeding by intoxicated, alcohol-impaired or amateur drivers will cause switching the car from accelerating to braking.

(d) More Independent from the Weather

It is provided in embodiments of the invention with converting of the car's kinetic brake energy to potential energy. Lessening of cohesive and friction forces in unfavorable weather increases the vertical force attached to the car. It shortens the car stop distance, hence improves the independence from the weather.

(e) More Effective and Energy Saving

As stated earlier, the use of a one pedal operating system eliminates two of three braking steps. It reduces the total braking time and makes possible faster and easier conversion of car's brake kinetic energy to heat energy. Further improvement is accomplished by conversion of the brake energy to electric and potential energy. Conversion to potential energy increases the vertical force, attached to the car; thereby decreasing the force of collision in emergency situations and improving independence from the weather. Conversion to electric energy improves safe driving and additionally saves energy. The invention realizes the conversion of the brake energy to other types of energy as well, as to heat energy. All these embodiments additionally reduce the losses caused by the car accidents and improve the reliability and durability of the car.

So, it is an object of the invention to provide equipment for creation of a one pedal safety driving system. It provides improved fast-acting, simpler driving operation, and psychological and logical substantiation to the system.

Another object of the invention is to provide equipment to convert the car's brake kinetic energy to electric energy. It provides energy saving to the system. This conversion also creates additional electric braking for the car instead of imperfect braking by the engine.

A further object of the invention is to provide equipment to convert the car's brake kinetic energy to potential energy. It provides additional safety driving and additional saving of energy.

Finally all of these objects provide reduction of the losses, caused by the car accidents approximately 20–40%.

Other objects and advantages of the invention will become more apparent from a consideration of the following drawings, specification, and ensuing description.

Figure 1:
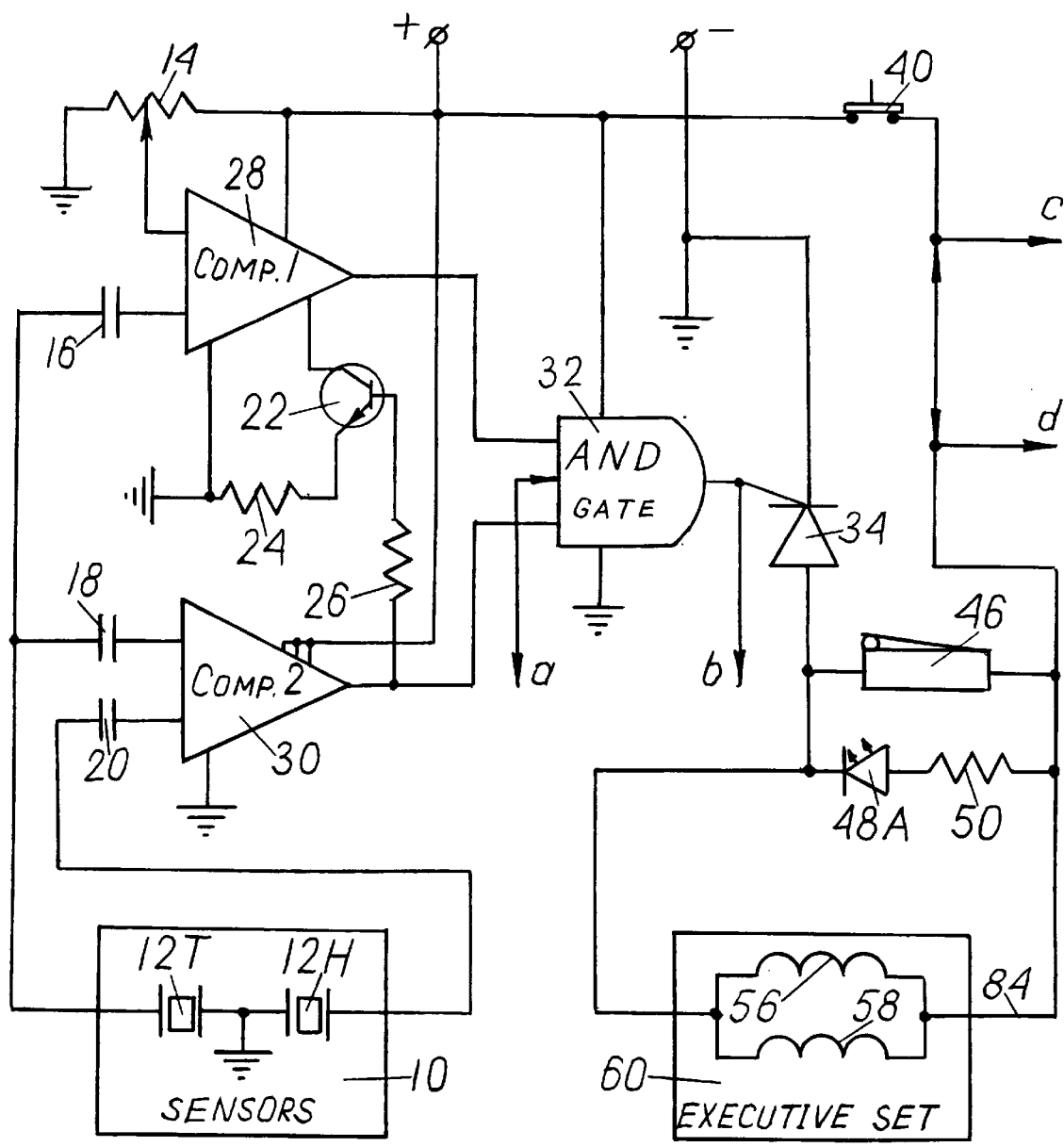
FIG. 1 is an electric diagram of the entire invention, illustrated as a partial block diagram.
Figure 3:
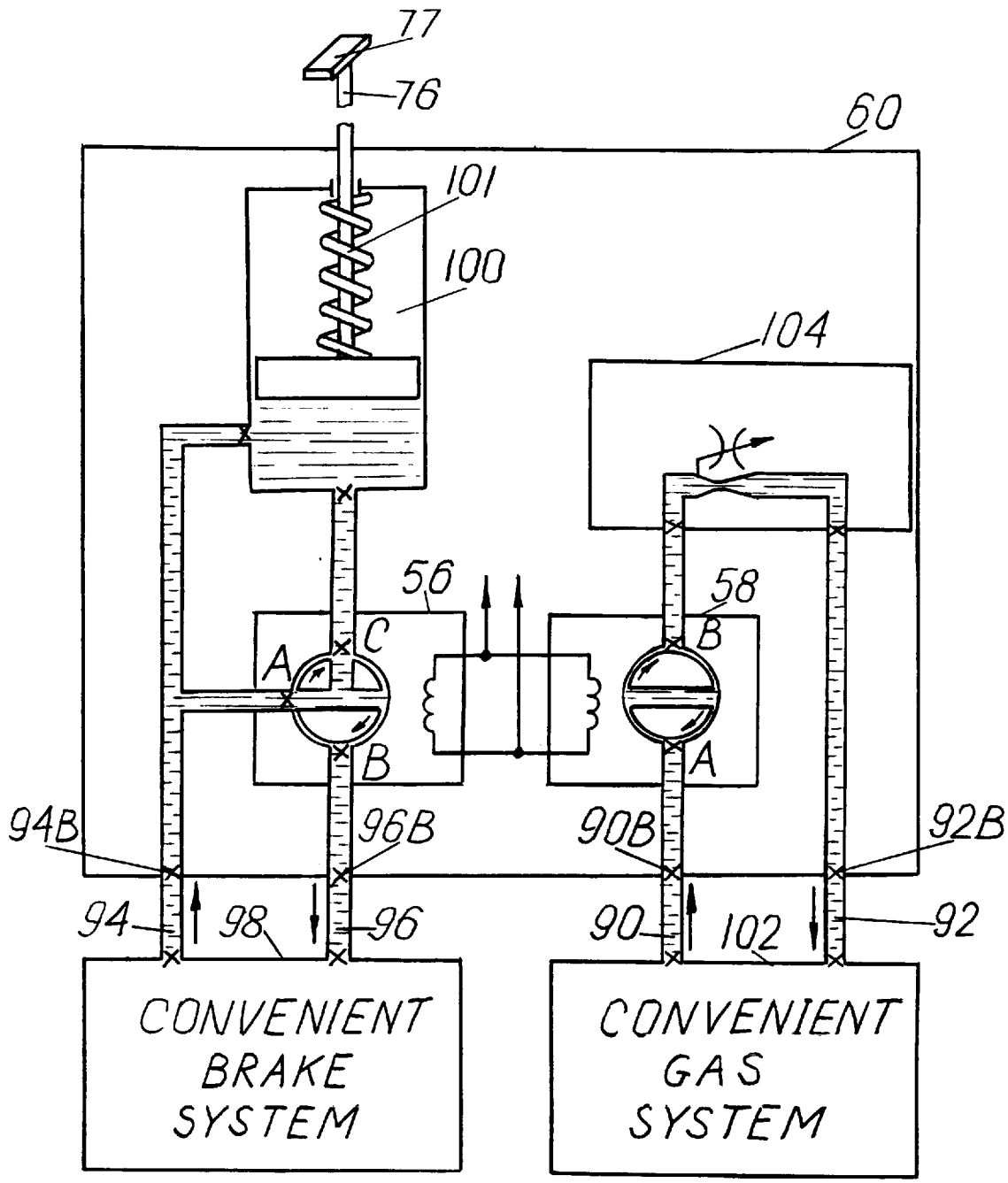
FIG. 3 is a hydraulic diagram of a basic executive set, used in preferred embodiment and adapted to convert the car kinetic energy to heat, friction energy.
Figure 4:
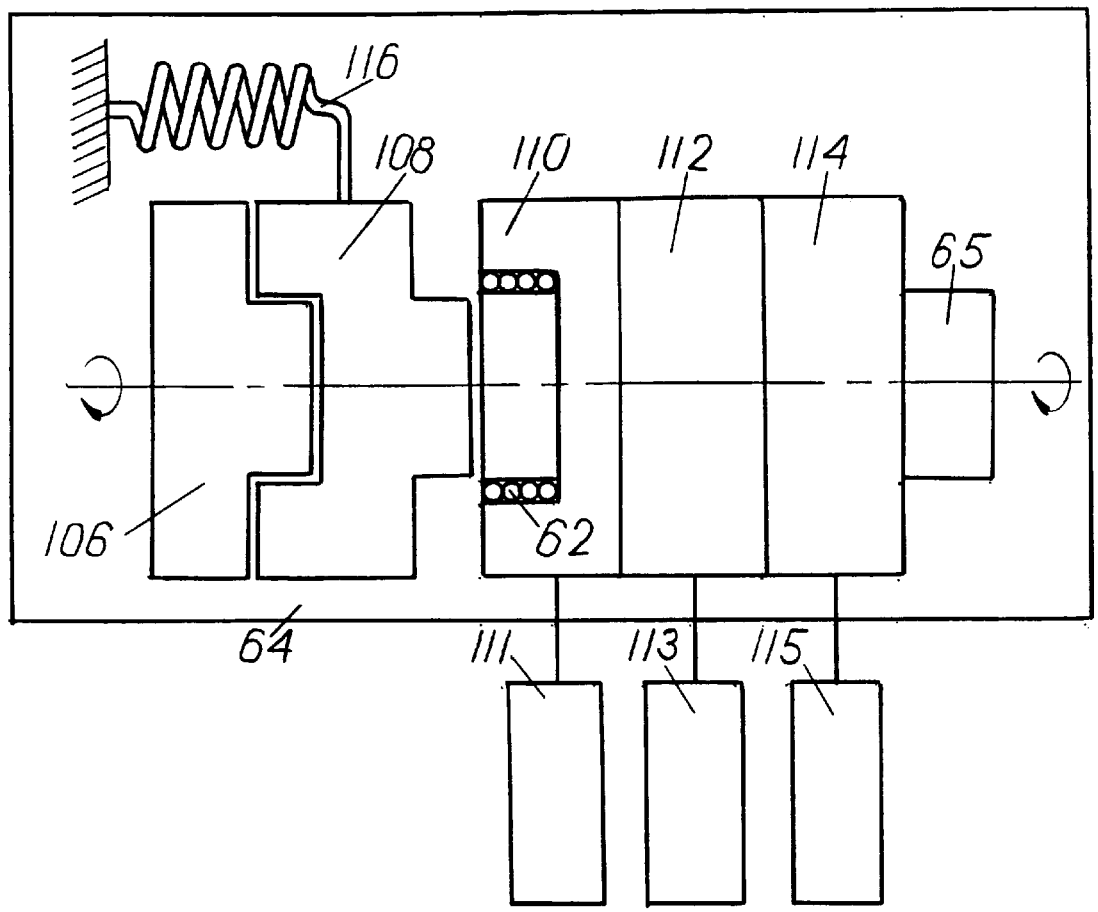
FIG. 4 is a switching diagram of a clutch executive set, adapted to convert the car kinetic energy to electric and potential energy.

The ramifications of the invention are distinguished from the preferred embodiment in FIG. 1 and FIG. 4 by dotted lines. Detachable hydraulic connections in FIG. 3 are marked by "X" symbols.

SUMMARY OF THE INVENTION

The present invention uses differences between accelerating and braking driver's foot pressure impulses. Acceleration is conscious, and its impulse is smooth and prolonged. Driver's braking impulse in case of sudden emergency is reflexive, sharp and quick. Moreover, in emergency situation the driver is on an alert and involuntarily moves his body ahead. The body's center of gravity is displaced ahead too. So, in this case the driver's foot toe pressure at the pedal is stronger, than driver's foot heel pressure.

The accelerating and braking pressure impulses are converted to an electric signal by a group of sensors. The stated earlier differences allow to select a brake electric pulse from the full electric signal, verify and form it by an input processing circuit. An input microchip comparator provides selection of the brake impulse from each sensor. A conjunction gate AND provides verification by identification of some selected pulses from different sensors. A group of output controllable electron valves, being actuated by the verified and formed processed brake pulse, provides an output current for any connected up load. The load, in the preferred embodiment is a basic executive set. The set switches the car from accelerating to braking by converting the car kinetic energy to heat, friction energy. In other embodiments the car brake energy is converted to electric and potential energy, that is more effective. After preventing of the damage, the driver switches the car back from braking to accelerating by operating of momentary pushbuttons to interrupt the output current.

Braking in offered invention is faster, because the system eliminates the steps of releasing and changing the pedal. It is also simpler, because the driver uses only one pedal. This braking is psychologically substantiated and reduces driver's mistakes in operating in emergency situations. It prevents traffic accidents caused by unskilled and intoxicated drivers. Finally this invention reduces losses, caused by car accidents.

REFERENCE NUMERALS IN DRAWINGS

In the parts, closely related figures have the same number but different alphabetic suffixes.

10—gas pedal
11—traction to the gas throttle in existing fuel system
12—pressure sensors; 12T—toe, 12H—heel
14—variable resistor
16, 18, 20—capacitors
22—strobing transistor
24, 26—resistors
28, 30—microchip comparators
32—conjunction gate AND
34, 36, 38—thyristor controllable electron valves
39—ribbon insert
40,42,44—momentary, one pole single throw (OPST), normally closed pushbuttons
45—connecting link, bridge
46—buzzer
48—level meter consisting 3 light emitting diodes 48A, 48B, 48C
50, 52, 54—resistors
56—3-way solenoid distributor valve with A, B, C ports
58—2-way normally closed (NC) solenoid bypass valve with A and B ports
60—basic executive set
62—solenoid of the clutch executive set
64—clutch executive set
65—series motor of the third executive set
66—potentiometer resistance sensor
68—capacitor
70—restricting current resistor
72—flip-flop, bistable trigger
74—device housing
76—piston rod of the hydraulic cylinder
77—seat of the rod
78—sensors' cord
80—feeding cord
82—steering wheel cord
84—output cord of the basic executive set
86—output cord of the clutch executive set
88—output cord of the third executive set 90B, 92B, 94B, 96B—fittings of the basic executive set
90, 92, 94, 96—tubes for hydraulic connections
98—brake system of the existing car
100—hydraulic single-acting cylinder
101—return spring
102—fuel system of the existing car
104—adjustable flow control valve
106—engine drive disk
108—wheel drive disk
110—generator drive disk
111—generator set
112—compressor drive disk
113—compressor set
114—lifting screw drive disk
115—lifting screws set
116—spring

DESCRIPTION OF INVENTION

In static state of the invention, a car moves in accelerating regime. Referring to the drawings in FIG. 2, the preferred embodiment comprises: a gas pedal 10 with additional sensors; an electric circuit device housing 74; a basic executive set 60, disposed under pedal 10 and joined to it mechanically by rod 76; electric cords 78, 80, 84; hydraulic tubes 90, 92, 94, 96.

Pedal 10 comprises all elements of the existing car gas pedal; its traction 11 controls fuel flow through the car fuel system. Pedal 10 has in addition a foot toe piezoelectric sensor 12T, and the same type and size foot heel sensor 12H. The sensors are plates with rectangular section 0.1*0.05 meter (m), stuck up into hollows of pedal 10. Sensors have a thickness 0.005 m and protected by a rubber insert 39. Sensor 12T is disposed approximately under driver's foot toe; sensor 12H disposed 0.02–0.03 m nearer to foot heel. Sensors 12T and 12H convert all driver's foot pressure impulses to an electric signal. Sensor cord 78 transmits the electric signal to inputs of device 74. Cord 78 is detachable connected by its end plug 78A to socket 78B of device 74. An opposite end of cord 78 is connected by plug 78C to socket 78D of basic executive set 60. The plugs and sockets of all other electric and hydraulic connections have the same letter conventional signs.

Device 74 comprises electric circuit elements. A pushbutton 40 at its control panel interrupts device output current by driver's operating. A light indicator level meter 48 is black out in static state. Feeding cord 80 energizes device 74 from any direct current 12 VDC power source as well, as from a car battery. Output cord 84 transmits output current of device 74 to a load. The load is a basic executive set 60, disposed under gas pedal 10. Cords 82, 86, 88 are used in embodiments.

Referring to the drawings in FIG. 3, executive set 60 includes: a hydraulic single-acting cylinder 100 with a piston plunger rod 76 and its return spring 101; a 3-way solenoid distributor valve 56; a 2-way solenoid bypass valve 58; an adjustable flow control valve 104; fittings 90B, 92B for fuel connections and fittings 94B, 96B for brake fluid connections; an electric socket 84B. Hydraulic cylinder 100 has the same feature, as a master cylinder, used in the car existing brake system. Executive set 60 is connected: electrically by output cord 84 to device 74; hydraulically by sockets and plugs of ½" (0.013 m) copper tubes 90, 92, 94, 96 to existing car gas system 102 and brake system 98; mechanically by a seat 77 of the piston plunger rod 76 to pedal 10. The solenoid valves are named further electromechanical sources, the rest parts of the executive set are named gas/braking assembly.

In static state: output current of device 74 through cord 84 is absent; solenoid valves 56 and 58 are in position, pointed in FIG. 3; fuel flow through executive set 60 is blocked by valve 58; brake fluid comes from a reservoir through input brake fluid tube 94, further passes cylinder 100, ports C and A of the 3-way valve 56 and returns back to brake system 98. Piston plunger 76 moves up-and-down in accordance with driver's speeding, without an influence at the car regime.

Referring to the drawings shown in FIG. 1, electronic device includes selector sources, output current sources, interrupter sources, indicator sources. Input sources include microchip comparators 28, 30, strobe transistor 22, and a common conjunction gate AND 32. Output sources include three thyristors 34, 36, 38, controlled by gate 32. Thyristor 34 is loaded with solenoids 56, 58 of executive set 60. Interruption sources include three one pole single throw (OPST), momentary, normally closed pushbutton switches 40, 42, 44. Indication sources include level meter 48 and a buzzer 46. Level meter 48 has three light emitting diodes 48A, 48B, 48C with restricting resistors 50, 52, 54.

An electric signal from piezoelectric sensor 12T comes to the input processing source through a capacitor 16. A microchip comparator 28 compares a rate of electric signal from sensor 12T with a fixed voltage V=5v, regulated by variable resistor 14. In static state the driver's force pressure at the pedal is about 50 Newton (N) and grows slowly. The rate of sensor 12T electric signal is lesser than the fixed voltage. A strobe transistor 22 is closed, so comparator 28 has a logic 0 at its output. Resistors 24 and 26 provide necessary regime for transistor 22. The electric signal from sensor 12H comes to input source comparator 30 through a capacitor 20. At another input of the comparator 30 comes electric signal from sensor 12T through a capacitor 18. Comparator 30 compares a difference between electric signal rates from sensors 12T and 12H. Driver's foot pressure at these sensors is approximately equal in static state. It causes a logic 0 at the output of comparator 30. This logic 0 causes a close state of transistor 22. Both logic 0 from comparators 28 and 30 come to inputs of conjunction gate 32. Gate 32 has two inputs in preferred embodiment, equal to the number of sensors. The logic 0 from an output of gate 32 comes to inputs of controllable electron valve thyristors 34, 36, 38. The voltage gets of thyristors anodes through pushbutton 40 and bridge 45. Pushbutton 42 is disposed at the car steering wheel and connected by electric cord 82. Pushbutton 44 is disposed at pedal 10 and connected up by leads of cord 78. In preferred embodiment pushbuttons 42 and 44 are short locked by bridge 45. All thyristors in static state are closed. So, solenoids 56 and 58, loading thyristor 34 through electric cord 84, are inactive. Level meter 48 and buzzer 46 are inactive in static state too.

There is an embodiment with an additional potentiometer resistance sensor 66. It comprises a capacitor 68, a resistor 70, a bistable trigger 72. A runner of sensor 66 is joined with gas pedal 10. It moves in proportion to driver's pressure at pedal 10. A capacitor 68 is charged through a resistor 70 and discharged through sensor 66. In accelerating regime the driver presses at the pedal smoothly, and the resistance of sensor 66 grows slowly. Capacitor 68 is discharged through sensor 66 faster, than it is charged through resistor 70. Low potential of capacitor 68 causes a logic 0 at the input of a microchip trigger 72. Logic 0 from output of trigger 72 comes to the input of gate 32. Gate 32 in this embodiment has three inputs.

A clutch executive set 64 is joined by cord 86 in embodiments with converting the car energy in other types of energy. It comprises a solenoid 62, actuated by thyristor 36, and electromechanical clutch 64 in FIG. 4, actuated by solenoid 62. Clutch 64 includes: an engine drive disk 106, a wheel drive disk 108, a generator drive disk 110, a lifting drive disk 114, a motor set 65, a spring 116. Motor 65 is actuated by thyristor 38 and joined by cord 88.

Following basic parts are used in preferred embodiment.

Pressure sensors 12 are piezoelectric plate PZT-5A, manufactured by "Morgan Matroc Inc." Their size is 0.1*0.05*0.005 m , material is Ziconate Titanate.

Comparators 28 and 30 type is LF111N, National Semiconductor Co (NS)

Transistor 22 is 2N2222.

Conjunctive gate AND 32 is CD4081

Thyristors 34, 36, 38 are C122D, 400V/5A, Philips Company.

Level meter 48 type is P519, Panasonic Optoelectronics.

Buzzer 46 type is P9948, 12VDC, Panasonic.

Solenoid valves 56, 58 are manufactured by Beco Manufacturing Co. Inc 23361 Peralta Drive Laguna Hills, Calif. 92653. Valves ordering format: S113W1DFRT132—3-way valve, S112C1DFRT—2-way valve.

OPERATION OF INVENTION

In case of danger a driver uses only one foot pedal to operate convenient gas and brake systems. This invention realizes braking the eliminating of the steps of releasing and changing the pedal. In this event driver provides predetermined abrupt pushing of the pedal 10, in accordance with his reaction. The driver's foot pressure at pedal 10 gets about 250N in brake regime.

Referring to the drawings in FIG. 1, these driver's actions cause activation in excess of the sensor 12T voltage rate on comparison with the fixed voltage of comparator 28. Simultaneously, the driver is on an alert and involuntary moves his body ahead. The driver's foot toe pressure gets stronger, than the driver's foot heel pressure. So, the input signal of comparator 30, coming from sensor 12T, exceeds the signal from sensor 12H. Therefore, comparator 30 gets a logic 1 at its output. It causes opening of strobe transistor 22, and logic 1 at the output of comparator 28 too. Logic 1 at both inputs of gate 32 causes logic 1 at thyristors' 34, 36, 38 inputs. Thyristor 34 actuates, linked up in the preferred embodiment, basic executive set 60 by output cord 84. A buzzer 46 honks and light emitting diode 48A flashes, warning that the car has changed the regime from accelerating to braking. To reset the accelerating regime the driver disconnects anode voltage of all thyristors by pushing any of series connected pushbuttons 40, 42, 44.

Executive sets 64 and 65 are linked up in other embodiments by output cords 86, 88; bridge 45 has been cut off. The light emitting diodes 48B and 48C indicate actuating of thyristors 36, 38 and sets 64, 65.

Correctness in determination of the brake impulse is growing in proportion to the number of sensors. So, there is an embodiment with an additional resistance potentiometer sensor 66. Runner of sensor 66 is joined with pedal 10. Sharp and quick driver's pressing at the accelerator pedal causes fast increasing of resistance rate of sensor 66. Capacitor 68 is charged through resistor 70 faster than it is discharged through sensor 66. When the voltage rate at the input of bistable trigger 72 exceeds a threshold of action, the trigger gets logic 1 at its output. The output of trigger 72 is connected with the input of gate AND 32. Conjunction gate 32 in this embodiment has three inputs.

Figure 2:
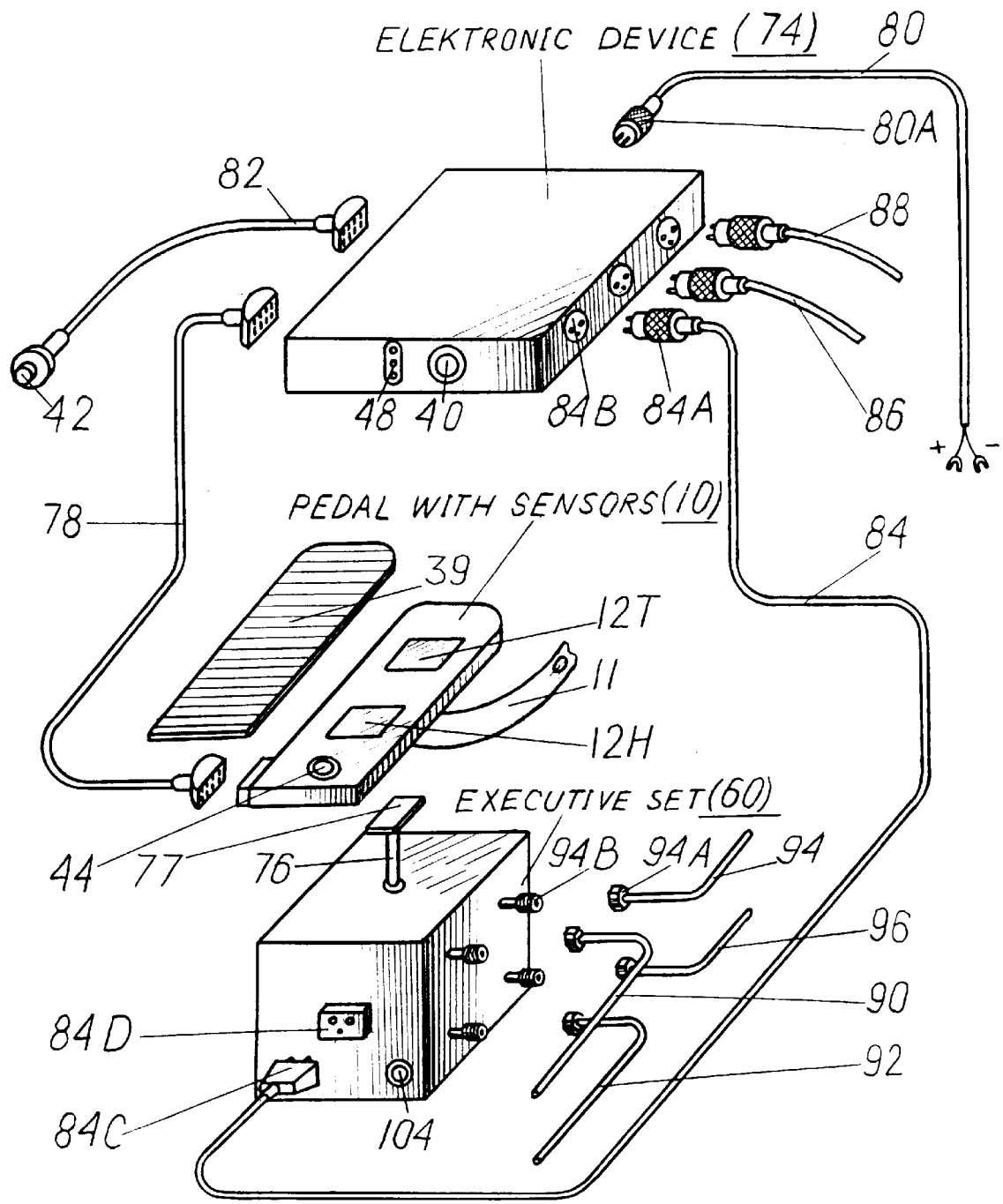
FIG. 2 is a plan view of used equipment and its interconnections in the invention.

Referring to the drawings in FIG. 2, actuation in consequence order of sensors and of the electric circuit of device 74 by the driver's reflexive pressure at pedal 10 causes actuation of connected up executive sets. In preferred embodiment basic executive set 60 is linked up by output cord 84. Actuated set 60 provides transmission of driver's pressure at pedal 10 to the existing car brake system. So, it provides slowing down of the car by converting of car kinetic energy to heat, friction energy, as usual. Connection of executive set 60 also causes flashing of light emitting diode 48A of the level meter 48, and buzzing of buzzer 46. It notifies, that the car has changed the regime from accelerating to braking.

After preventing the danger, the driver presses for a moment pushbutton 40 and releases pedal 10. This deactuates device 74, switches the car back to accelerating regime, and stops light and sound indication. Then the driver, little by little, increases speeding by smooth pressing at pedal 10. There is an embodiment that provides changing of car regime back from braking by pressing a pushbutton 42 at pedal 10 with the driver's heel. It allows the driver to keep his hands stable on the steering wheel. Other versions change the regime by pressing a pushbutton 44 at the steering wheel. The bridge 45 in these cases has been cut off.

In other embodiments cords 86, 88 connects clutch executive set 64 and third executive set 65. Executive set 64 converts car kinetic energy in braking moment to electric and potential energy, that is more effective. Set 65 activates conversion of car brake energy to potential energy.

Referring to the drawings in FIG. 3, connecting of executive set 60 by cord 84 to the device 74 provides actuation of solenoid valves 56 and 58. Actuated valve 56 connects the valve port C to B, and disconnects port A. Brake fluid enters in hydraulic cylinder 100 through fitting 94B and tube 94, from a reservoir of existing car brake system 98. Bottom output of hydraulic cylinder 100 through actuated valve 56 is joined with fitting 96B. Driver's pressing at pedal 10 through seat 77 and piston plunger 76 causes increasing of brake fluid pressure in existing car brake system 98 through tube 96. So, it causes slowing down of the car, just as usual. Simultaneously the actuated 2-way fuel valve 58 connects ports A and B. It bypasses fuel circuit to the fuel system 102 through tube 90, fitting 90B, actuated fuel valve 58, fitting 92B, tube 92. Adjustable flow control valve 104 regulates bypassing. Actuating of solenoid valve 58 reduces a fuel consumption in brake moment and makes easier and faster the slowing down of the car.

Referring to the drawing in FIG. 4, actuating of the device 74 actuates, linked up by output cord 86, clutch executive set 64. Actuated solenoid 62 of set 64 disconnects the wheel drive disk 108 from the engine drive disk 106 and connects disk 108 to the generator drive disk 110.

The additional generator 111, connected by the disk 110, uses the energy of rotating wheels. It creates an additional electrical brake force for the car wheels. This switching additionally reduces the car stopping distance, and charges the car battery. The spring 116 returns the clutch in static state after deactuating of the clutch solenoid. This embodiment provides converting of car kinetic energy in braking period to electric energy.

The next embodiment provides converting of car kinetic energy to potential energy. A compressor drive disk 112 is rigidly connected to the generator drive disk 110 and drives a compressor set 113. Compressor 113 creates an air cushion for the car. Air cushions are more effective than used in present car air bag, because air cushions prevent damage before the accident. Another variation of this embodiment creates an aerodynamic lifting force by a screw drive disk 114. Disk 114 drives a lifting screws set, providing a vertical raising force for the car. Even if the air cushion force and the lifting screw force is not enough to obtain a reasonable amount of lift, the vertical force, attached to the car will weaken the force of collision.

Figure 5:
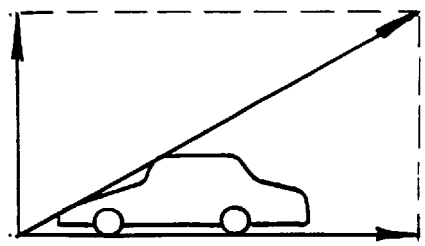
FIG. 5 is a vector diagram of forces, attached to the vehicle, when its energy is converted to potential energy.

Referring to the drawing in FIG. 5, any meaning of vertical force will increase the angle between the moving car and the obstacle. It will reduce the force of collision and losses, caused by car accidents. The sources of present invention do it much more easier, than the sources of the existing system. To improve the lifting force, another embodiment connects an additional executive set 65. The series motor of the set quickly increases the speed of rotation of the compressor set 113 and lifting screws set 115. Increasing of electric energy consumption from the car battery will be compensated by decreasing of losses caused by car accidents.

One more appliance of this invention is using it for driver's training. In this case the load of thyristor 34 is light and sound indication sources. Actuation of them forewarns the driver that his speeding is dangerous. Correct speeding will improve safe driving even by using the existing car brake system. There are variations of training system including executive sets 60, 64, 65 too.

CONCLUSION, RAMIFICATIONS AND SCOPE OF INVENTION

The present invention improves the car brake system and eliminates the steps of releasing and changing the pedal. Eliminating of two from three existing steps in braking first lessens the brake time 20–40% approximately. The full stop distance is in proportion to this time, and the number of accidents is in proportion to the stop distance. So, the invention reduces losses, caused by car accidents, weakens the force of collision, improves the safety driving.

Second, the offered system is much more simpler in operating. This advantage will provide a good market for invention. An automatic transmission was developed in the USA in 1940. It reduced the number of car operating pedal to two. In spite of higher price and bigger fuel consumption, now 90% of produced car are provided with automatic transmission. It is the time now to reduce the number of car operating pedals to one.

Third, the system is more logically and psychologically substantiated, because the offered invention:
 prevents the traffic from unfounded increasing of speed by intoxicated or alcohol-impaired driver, or non-motorist; speeding of such driver causes switching of the car from accelerating to braking;
 eliminates the accidents, caused by mistaken driver's pressing at another pedal in case of emergency.
 reduces the time to choose operating pedal; the driver without doubt presses at the gas pedal.

Forth, the embodiment of the invention with converting the car kinetic energy to potential energy provides more independence of the brake system from the weather; reducing of cohesive and friction forces in bad whether increases attached to the car vertical force, hence weakens the force of collision.

Fifth, the embodiments with conversion of car braking kinetic energy to electric and potential energy reduces losses of energy to waste heat, therefore this conversion is more effective and economical. Providing such conversion in existing brake system is impossible, because it will rise the brake time.

Thus the reader will see, the basis of the invention allows to produce a wide range of safety driving appliances. The simplest of them only forewarns the driver about his wrong driving. The most complex appliance has all above mentioned advantages. A lot of ramifications and embodiments of this invention is one more proof of its progressiveness. The disclosure of the invention described herein-above represents the preferred embodiments of the invention; however, variations thereof, in the form, construction, and arrangement of various electronic components thereof and the modified application of invention are possible without departing from the spirit and scope of appended claims.

For example:
 Invention can use various additional types and numbers of sensors; electric circuit device in these ramifications has a number of input sources, equal to the number of sensors;
 It is possible to convert the car brake kinetic energy to other types of energy;
 It is possible to design a big integrated circuit (BIC) for the electric circuit of the invention;
 It is possible to use the horn and emergency light of the existing vehicle as indication source; it will notify the pedestrians and police, that the driver is unskilled or intoxicated.
 It is possible to use proportional solenoid valves in invention. In this case braking and bypassing will be additionally regulated by driver's force pressure at the pedal.
 One pedal system can be used in electric powered vehicle as well, as in vehicle with internal combustion engine. Using it in electric powered vehicle is simpler and more effective. In this case the invention converts the brake kinetic energy directly in electric energy, without hydraulic conversions.
 It is possible to design a non-stopping emergency vehicle at the basis of present invention. To prevent damage this vehicle will change for a short term its regime from rolling to flying, instead of braking. There is much more free place to avoid damage in the air, than at the ground. However moving in the air requires about three times more energy; that is why impossible to change the rolling vehicles by flying ones. The sources of invention provide for a short-term period changing of the movement.
 It is possible to design a system with automatic regulation of optimum raising force to minimize the force of cars collision.

Thus the scope of the invention should be determined by the appended claims and their legal equivalents, rather than by the examples given.

I claim:
1. A gas/braking selective system for a vehicle having only one control floor pedal, comprising:
 a sensor means for distinguishing braking and acceleration;
 a selective device including: a selector means, an output current means connected to an interrupter means, an indicator means, and an input of said selective device connected to said sensor means;
 an executive set including: an electromechanical means, and a gas/braking assembly means, an input of said executive set being connected to an output of the selective device; an output of said executive set being coupled to a gas and a brake convenient system of the vehicle;
 whereby smooth prolonged pushing of the pedal actuates said gas/braking selective system of the vehicle, and an abrupt pushing of the pedal a predetermined amount actuates, in consequence order: said selector means, said output current means, said indicator means in parallel with said electromechanical means, said gas/braking assembly means, and said brake convenient system of the vehicle; subsequently said interrupter means is activated to disconnect said output current means, providing a resetting of the vehicle to its acceleration regime.

2. The system of claim 1 wherein said sensor means includes foot toe and foot heel piezoelectric plate pressure sensors installed on the pedal.

3. The system of claim 1, wherein the selective device is energized from a vehicle battery by a power cord and connected to said sensor means by an input cord, said selector means includes a group of comparators with a strobe transistor and conjunction gate, said output current means includes a group of gate controlled thyristors connected in series with said (normally closed momentary push-button) interrupter means, said indicator means includes a group of light emitting diodes and a buzzer.

4. The system of claim 1, wherein said executive set is connected to the device by an output cord and coupled to the convenient gas and brake systems by fittings and tubes, said electromechanical means includes a 3-way solenoid brake fluid distributor valve and a 2-way normally closed solenoid fuel bypass valve, said gas/braking assembly means includes a master cylinder with a plunger rod and associated seat, and an adjustable fuel flow valve.

5. The system of claim 1, further including a resistance potentiometer sensor with a runner coupled with the pedal, and a selecting brake impulse bistable trigger.

6. The system of claim 1, wherein the interrupter means includes a push-button interrupter means located at a steering wheel.

7. The system of claim 1, wherein the interrupter means is a push-button interrupter means located at the pedal.

8. The system of claim 1, further including a clutch executive set to convert the vehicle kinetic energy during braking into electric energy.

9. The system of claim 1, further including a clutch executive set to convert the vehicle kinetic energy during braking into potential energy.

10. The system of claim 1, further including an additional independent power supply for the system.

11. A method of emergency braking of a moving vehicle wherein braking and acceleration is controlled by a single foot pedal, comprising the steps of:

abrupt pushing of the pedal, by an operator of the vehicle, a predetermined amount, said pedal having an associated sensor means, whereby said sensor means transmits, through a sensor cord, an electric signal to an electric device means;

actuation of an executive means by an output current of said electric device means;

conversion of vehicle kinetic energy to other useful energies, such as frictional/braking energy, by said executive means;

interrupting said output current through the executive means by the driver's operating of an interruption means, whereby the executive means switches the vehicle back from a braking regime to an accelerating regime.

12. The method of claim 11, further including actuating of a clutch executive set, whereby the vehicle's kinetic energy during braking is converted into electric energy.

13. The method of claim 12, further including actuating of an additional executive set, whereby the vehicle's kinetic energy during braking is converted into potential energy.

14. A system for gas/braking training of a vehicle operator, using only one control pedal, comprising:

a sensor means for distinguishing braking and speeding, said sensor means being connected to said pedal;

a selector device having a selector means, an input of said selector means being connected to said sensor means, an output of said selector means being connected through an amplifier to an indicator means in series with an interrupter means;

whereby abrupt speeding to a predetermined velocity actuates the system wherein said indicator means is activated to emit a warning light and sound;

said indicator means can subsequently be disconnected by the actuation of said interrupter means.

15. The system of claim 14, further including a second interrupter means located on an associated steering wheel.

16. The system of claim 14, further including an additional interrupter means on the pedal.

17. The system of claim 14, further including an executive set, said executive set connected in parallel to said indicator means and coupled to a gas and brake system of said vehicle, whereby when vehicle velocity abruptly increases, said brake system is actuated to switch said vehicle from an acceleration regime to a braking regime; and thereafter actuation of said interrupter means resets the vehicle to its acceleration regime.

* * * * *